Nov. 14, 1961 P. SAMMARCO 3,008,220
METHOD OF ASSEMBLING TIRE CARCASS ROLLS
Original Filed July 30, 1958 3 Sheets-Sheet 1

INVENTOR
Peter Sammarco
Paul O. Pippel
ATTORNEY

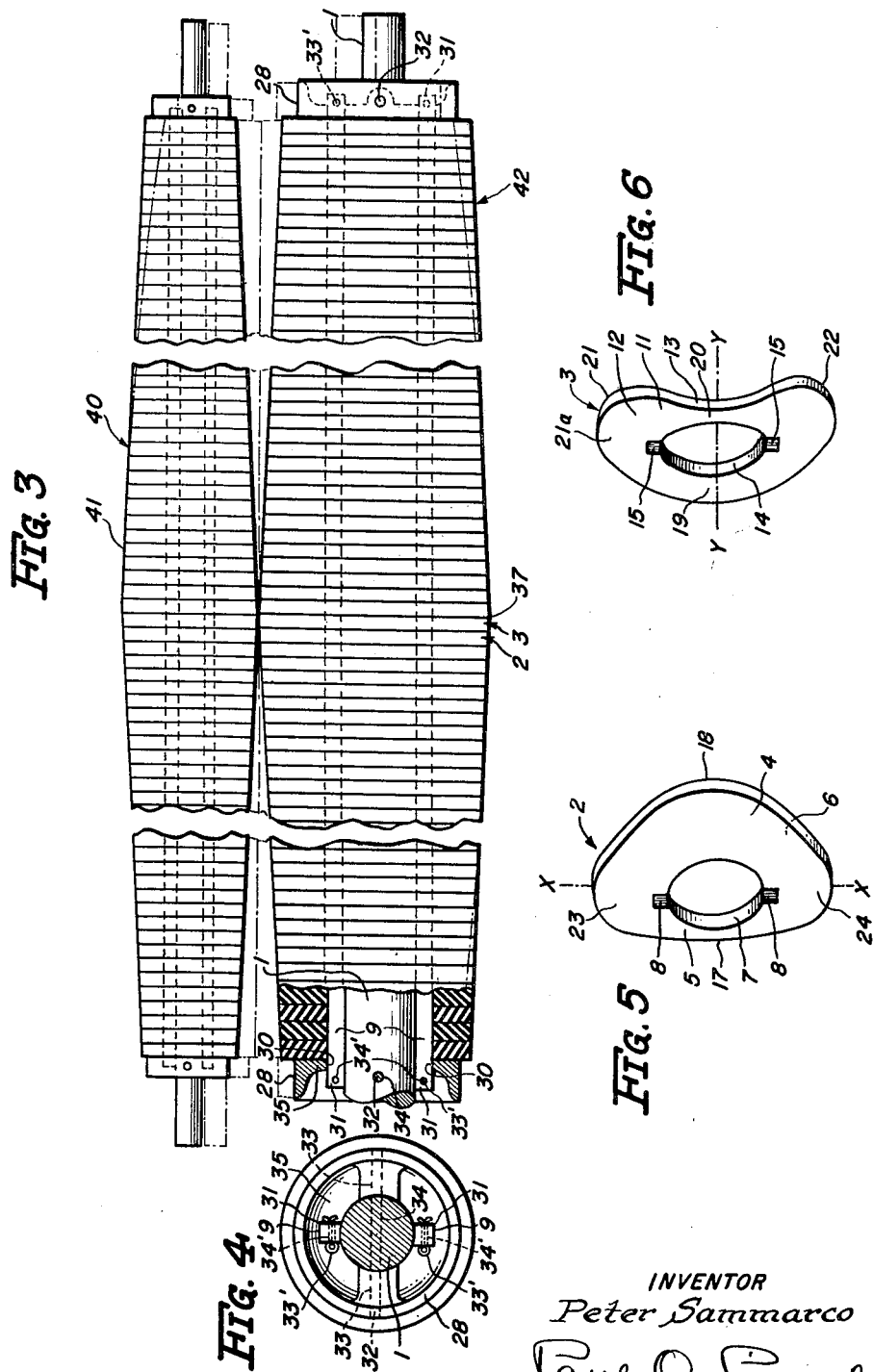

Nov. 14, 1961 P. SAMMARCO 3,008,220
METHOD OF ASSEMBLING TIRE CARCASS ROLLS
Original Filed July 30, 1958 3 Sheets-Sheet 3

INVENTOR
Peter Sammarco
Paul O. Pappel
ATTORNEY

United States Patent Office 3,008,220
Patented Nov. 14, 1961

3,008,220
METHOD OF ASSEMBLING TIRE CARCASS ROLLS
Peter Sammarco, Bellwood, Ill., assignor to International Harvester Company, Chicago, Ill., a corporation of New Jersey
Original application July 30, 1958, Ser. No. 752,078. Divided and this application Dec. 21, 1959, Ser. No. 860,847
4 Claims. (Cl. 29—148.4)

This invention relates to tire carcass rolls of the type which comprise a series of disks stacked together on a shaft and held under compression thereon and is a division of my U.S. application Serial No. 752,078, filed July 30, 1958 for Method of Assembling Tire Carcass Rolls and Roll Made by the Process.

A general object of the invention is to provide a novel, inexpensive and durable roll which is made of tire carcass disks.

Rolls made of tire carcass and particularly those which are subjected to heavy loadings must be made with the disks compressed substantially uniformly about the circumference of the roll. The disks which are used in such rolls, being made of tire carcass, are curved in their static condition. The assembly of such disks on a shaft has heretofore been accomplished by cupping the disks together and then compressing the entire stack in order to straighten out the disks and hold them in contact with each other. I have found that this method of assembling is entirely unsatisfactory, especially for rolls which are used under loads such as crushing rolls. The effect in cupping all of the disks produces uneven pressure distribution around the periphery of the roll in that where the disks contact each other the pressures are extremely high and in between the contact points the pressures diminish so that there are actual voids between adjacent disks. In the use of such rolls for crushing I have found that these variations in compression and the presence of voids between the adjacent disks to such an extent that friction heat developed and destroyed the roll by burning.

It is a primary object of the invention to provide a method of making a tire carcass disk roll which is entirely free of the defects heretofore mentioned.

More specifically, the invention contemplates a novel method of assembling the disks on the center shaft with alternate disks being disposed with their axes of curvature substantially perpendicular to each other so that in their static condition the disks contact each other at points spaced at the ends of their curvature.

The invention contemplates stacking the disks in groups and individually compressing the groups commencing with the center group and then the next group outwardly of the center group so that the stacks or groups are compressed in small increments.

A still further object of the invention is to so arrange the disks with respect to the shaft so that the disks will not rotate with respect thereto and at the same time the modulus of the elasticity of the entire roll assembly is not disturbed but is substantially constant throughout the entire circumferential extent of the roll.

To this end it is an object of the invention to provide a novel keying arrangement for interconnecting the disks with the shaft to accommodate substantially uniform transverse deflection of the roll about its entire periphery.

These and other objects of the invention will become more apparent from the specifications and the drawings, wherein:

FIGURE 3 is a side elevational view partially in axial section of a pair of rolls made in accordance with the invention;

FIGURE 4 is an end view of one of the rolls;

FIGURE 5 is a perspective view of one of the disks;

FIGURE 6 is a perspective view of the other of the disks, and

Figure 1:
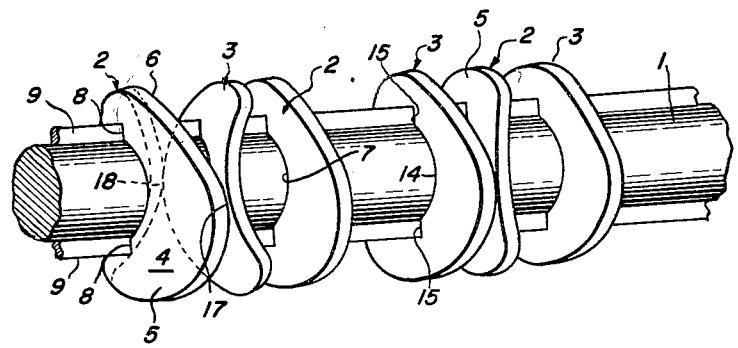
FIGURE 1 is a fragmentary perspective view of the roll assembly illustrating the first step in assembling the disks.

Describing the invention in detail and having particular reference to FIGURES 1 through 6 there is shown a center shaft 1 on which there are sleeved the pairs of disks 2 and 3. It will be seen that the disk 2 comprises an annulus 4 and since it is formed of tire carcass material it is curved about the axis X—X (FIG. 5) and that it has a convex side 5 and a concave side 6 (FIG. 1). The disk 2 has a central aperture 7 and diametrically opposed keyways or grooves 8, 8 for reception of the loose keys 9, 9, the keys 9 being disposed at diametrically opposite sides of the shaft 2.

Each disk 3 is also made of tire carcass and is curved about the axis Y—Y (FIG. 6) and comprised the annulus 11 which has a convex side 12 and the concave side 13. Centrally thereof the disk 3 is provided with an aperture 14 for snug fit on the shaft 1 and at opposite sides of the opening 14 there is provided keyways or slots 15, 15 for reception of the keys 9, 9.

In observing the disks shown in FIGURES 5 and 6 it will be noted that the two disks are substantially identical except that they are oriented at substantially 90° with respect to each other.

I have found that heretofore in constructing rubber disk rolls the practice has been to cup the consecutive disks and after all of the disks have been placed on the shaft they were subjected to a compressive force at opposite ends in an attempt to compress the same and straighten out the disks so they assume a radical shape. In actual practice I have found that this has obtained unequal compression of the disks and that they would compress excessively at their initial points of contact and that they would be relatively loose at points of maximum curvature.

Figure 2:
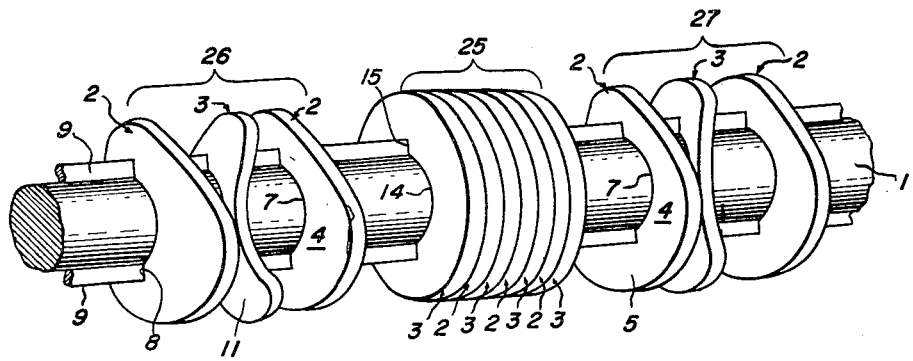
FIGURE 2 is a fragmentary perspective view similar to FIGURE 1 illustrating subsequent steps in assembling the roll.

My method of making the rolls comprises the steps of alternating disks 2 and 3, that is, arranging the disks so that their axes of curvature are angularly related to each preferably at 90° to each other as shown in FIGURES 1 and 2 so that the diametrically opposite high point areas or ends of curvature at 17 and 18 of disk 2 contact the crest points 19 and 20 of the convex side 21a of disk 3. Similarly the end of high points 21 and 22 of disk 3 contact the diametrically opposite sides of the next succeeding disk at the crest points 23, 24 on the convex side 5 of the disk 2. Thus the axes of curvature of alternate disks are angularly related at approximately 90° to each other. The disks 2 and 3 are sleeved onto the shaft on the keys 9 in alternating sequence in a first grouping 25 of a plurality of disks preferably about six or seven of such disks are compressed together at the medial portion of the shaft assembly and these disks are compresed under sufficient pressure to group them in face-to-face contact along substantially radial planes as shown in FIGURE 2. It will be seen that the disks first placed as shown in FIGURE 1 and then they are grouped together and compressed at the center portion of the shaft preferably as shown in FIGURE 2. When the first group of disks are compressed the material flows radially and I have found that if sufficient pressure is exerted this group of disks and each succeeding group will substantially remain as shown in the grouping 25 even after the pressure is removed. The internal friction of the expanded material which reduces the size of the center apertures 7 and 14 as well as of the grooves 8 and 15 of the disks 2 and 3 forces the material into tight engagement with the shaft and the keys and the friction developed is sufficient to prevent the disks from separating. Following the initial grouping 25 other groupings 26 and 27 are formed at opposite sides of the grouping 25, the disks 2 and 3 being alternated and the disks of group 26 and 27 are then compressed against opposite ends of the group 25. Other groupings of disks such as 26 and 27 are continued at opposite ends of the groupings pressed on the shaft until the entire roll is built up, then the end caps 28 and 28 are sleeved over the ends of the shaft 1 and aligned with their apertures 30, 30 with the ends 31 of the keys. The end caps are then pressed toward each other pressing the entire roll assembly and the keys or pins 32 are passed through the openings 33 in the caps and through axially aligned openings 34 in the respective ends of shaft 1. Thereafter the cotter keys 33' are extended through the openings 34' in the ends of the keys, the cotter keys being outwardly of the radial wall 35 of the end cap and being spaced outwardly therefrom whereby the keys are loosely held in place. However, the keys are interlocked with the caps against circumferential movement and the end caps are keyed by the pins 34 to the shaft whereby the shaft, keys and end cap form a shaft assembly which rotates in unison and the respective disks also rotate with the shaft assembly, the disks constituting the body portion of the roll. After the disks are applied then the roll is crowned by removing excess material as by grinding so that it is of maximum diameter at its center as at 37 and tapers toward opposite ends. This is acomplished by grinding off the periphery of the body portion of the roll and the taper is so chosen as to establish substantially uniform pressure contact with the associated roll 40 which is indicated at 41, the roll 40 being made up substantially exactly as the roll 42.

Figure 7:
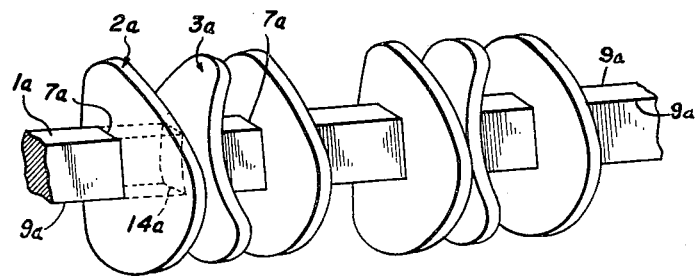
FIGURES 7 and 8 are similar to FIGURES 1 and 2 illustrating different embodiments of the invention.
Figure 8:
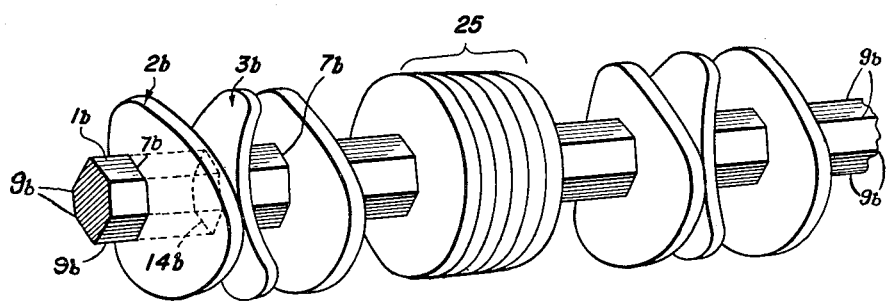

Referring now to the embodiment shown in FIGURES 7 and 8 it will be seen that in both of these embodiments the structures are substantially similar to that shown in the first embodiment and, therefore, identical parts are identified with corresponding reference numerals with the addition of a subscript. In the embodiment of FIGURE 7 shaft 1 has been substituted by the shaft 1–a and is of square configuration and therefore the openings 7–a and 14–a of disks 2–a and 3–a are made square. In the embodiment of FIGURE 8 the center shaft as identified 1–b is hexagonal and the openings 7–b and 14–b in disks 2–b and 3–b are also made hexagonal. Thus in these two embodiments of FIGURES 7 and 8 the keys 9 have been eliminated. However, the points 9–a in FIG. 7 and 9–b in FIG. 8 are the keying means and function the same as the keying means 9 in the previous embodiment. The shallow depth of 9–a and 9–b and the gradual change in section obviates the problems incidental to a welded key or large single or diametrical dual key designs of previous attempts.

What is claimed is:

1. In a method of assembling a roll of the type comprising a center shaft and a plurality of axially curved disks with center apertures comprising the steps of sleeving the disks on the shaft with the axes of curvature of successive disks angularly offset circumferentially of the roll with respect to each other, and then compressing the disks axially to an extent sufficient to flatten the disks in tight void-free engagement with each other along their entire opposing faces under substantially uniform compression about the circumference of the disks and securing the disks in such relationship on the shaft.

2. In a method of making a roll of the type comprising a center shaft and a plurality of fiber impregnated axially curved annular, center-apertured rubber disks comprising the steps of arranging several of the disks in a first group in the shaft with the axes of curvature of adjacent disks disposed substantially perpendicularly to each other, then axially compressing the first group of disks to flatten the same and tightly engage the same with each other to obtain substantially uniform compression of the disks about their circumference and to tightly engage the disks with said shaft, then disposing subsequent groups of several disks each arranged similarly as the disks of the first group on the shaft, and compressing the same against the preceding to produce substantially even pressure distribution between the disks around the periphery of the roll groups.

3. A method of manufacturing a roll of the character described which comprises a shaft structure with key means thereon and a plurality of complementally apertured tire carcass disks which are axially curved comprising the steps of mounting the disks on the shaft and arranging the adjacent disks in non-nesting relation, and then axially compressing the disks while in non-nesting relation to flatten them and tightly engage each other to form a body with said disks substantially uniformly compressed about the entire circumference of the roll, and then clamping the disks to hold them together in said arrangement.

4. The invention according to claim 3 and then shaping the body to desired peripheral contour by cutting the body about its periphery.

References Cited in the file of this patent

UNITED STATES PATENTS

| 125,787 | Cable | Apr. 16, 1872 |
| 2,324,050 | Shelley | July 13, 1943 |
| 2,416,123 | Siemen | Feb. 18, 1947 |
| 2,720,692 | Lorig | Oct. 18, 1955 |
| 2,801,461 | Kusters | Aug. 6, 1957 |

FOREIGN PATENTS

| 767,234 | Great Britain | Jan. 30, 1957 |